United States Patent [19]

DuPree

[11] Patent Number: 5,175,558
[45] Date of Patent: Dec. 29, 1992

[54] NULLING SYSTEM FOR CONSTRAINING PULSE JAMMER DUTY FACTORS

[75] Inventor: James E. DuPree, Redondo Beach, Calif.

[73] Assignee: TRW Inc., Redondo Beach, Calif.

[21] Appl. No.: 833,184

[22] Filed: Feb. 10, 1992

[51] Int. Cl.$^5$ .......................... G01S 3/16; G01S 3/28
[52] U.S. Cl. .................................................. 342/378
[58] Field of Search ........................ 342/378, 381, 384

[56] References Cited

U.S. PATENT DOCUMENTS 4,651,155  3/1987  Baurle et al. ...................... 342/378
4,931,977  6/1990  Klemes ............................... 342/378

Primary Examiner—Theodore M. Blum
Attorney, Agent, or Firm—G. Gregory Schivley; Ronald L. Taylor

[57] ABSTRACT

An adaptaive nulling antenna control system (24) which is effective in constraining pulse jammer duty factors. The system (24) accepts signals from a multibeam antenna (40) in a coded communication network (10). A band stop filter (50) removes the communication signal and analyzes the various antenna channels to form a nulling signal which is then combined with the original antenna signal to effectively null the jamming signal in those directional channels in which the jamming signal appears. The system (24) utilizes a successive over-relaxation type algorithm featuring scaling, eigenvalue shifting, and adaptive memory to give a fast attack time and slow release. The system (24) can be implemented in a pipeline architecture to further increase processing speed.

15 Claims, 9 Drawing Sheets

NULLING SYSTEM FOR CONSTRAINING PULSE JAMMER DUTY FACTORS

BACKGROUND OF THE INVENTION

1. Technical Field

This invention relates to adaptive multibeam antenna communication systems, and more particularly to an adaptive multibeam antenna system for constraining pulse jammer duty factors.

2. Discussion

Various types of adaptive antenna control systems have been developed to counteract jamming signals. In general, adaptive antenna control systems respond to a jamming signal by forming a nulling signal which, when combined with the signals received by the antenna, greatly reduces the gain in the direction (channel) in which the jamming signal appears.

A number of mathematical techniques, known as nulling algorithms, have been used to analyze jamming signals and produce effective nulls. These algorithms each have advantages and disadvantages depending on system factors such as the antenna, the noise environment, and the communication link. For example, a multibeam antenna, as opposed to a phased array, presents a non-uniform distribution of power to the feed elements. The use of scaling based on measured power levels, together with eigenvalue shifting, is advantageous with multibeam antennas because it exploits the antenna's non-uniform distribution of power to produce faster nulls with simple algorithms. During nulling, the communication link requires protection against jammer bursts. Coding techniques such as forward error correction coding with interleaving can provide this protection only if the duty factor of the high power bursts is less than a critical value. This critical value is a function of coding complexity and modulation format. Since the nulling antenna's output jammer power is the product of the received jammer power and antenna gain in the jammer's direction, the relationship between gain and duty factor constrains the effect of jammer bursts on the bit error rate performance of the link. To obtain a small duty factor of the high gain state presented to the jammer by the adaptive antenna requires a fast-attack/slow-release nulling transient response.

Direct approaches, such as direct matrix inversion and conjugate-gradient methods, lack this "null memory" characteristic and recover too quickly. Fixed step-size gradient algorithms are too sensitive to eigenvalue spread and converge slowly if the eigenvalue ratio is large. Iterative algorithms based on relaxation offer compromises that appear well suited to realistic jammer threats. They feature scaling and eigenvalue shifting, which reduces the condition number of the iteration matrix so that the eigenmodes converge at consistent speeds when forming nulls. Thresholding the scaling and eigenvalue shifting operation is a modification that preserves the adaptive null memory to accommodate interleaved burst-error coding requirements.

Blinking jammers may try pseudo random on-off modulation and power level control strategies. Realtime scaling, at the iteration rate, combats non-stationary power levels and retains consistent "fast-attack" characteristics. Adaptive step-size control further optimizes the convergence speed of the algorithm. Forward error-correction codes need interleaving to protect the communication link against burst errors. Faster nulling reduces burst lengths and therefore requires a smaller interleaver to protect the communication link until the adaptive antenna forms nulls. The combination of nulling and coded spread-spectrum processing provides substantial jammer protection. Once the null is formed, further jamming is useless and will soon be discontinued.

In the classic burst channel, the period between jammer bursts when the channel is error-free, is called the guardband. Rate - one half Reed -Solomon codes and interleavers can be designed to correct all burst errors with a guardband/burst-duration ratio as small as three. However, rate - $\frac{1}{2}$ Viterbi-decoded convolutional code using pseudo-random interleaving lose only one dB of margin for duty cycles of 10% or less with erasure decoding and 1% for errors-only decoding. My analyses of other, practical, burst-coded channels show similar results, except that a trade-off is allowed between power level and duty-factor. "Slow release" of null patterns insures a guardband of low gain between jammer bursts sufficient to keep the duty-cycles in this range. Fast-attack/slow-release transient characteristics depend on retaining a spread between eigenvalues of the iteration matrix in the on-off and off-states of the blinking jammer. This spread is naturally present in fixed step-size algorithms, but the attack-time can be better controlled in more advanced algorithms by scaling, eigenvalue shifting, and adaptive step-size. Since nulling also reduces the service area of coverage to users, it is more efficient to allow some margin for low powered interference and apply scaling only if the noise power level exceeds a given threshold.

Thus, it would be desirable to provide an adaptive nulling antenna control system which can provide effective nulling against blinking jammers. In this regard, it would be desirable to provide such a nulling antenna control system which can produce nulls very quickly and maintain the null relatively long to provide a fast attack and slow release performance. Further, it would be desirable to provide such an nulling antenna control system which utilizes an iterative algorithm incorporating real-time scaling and eigenvalue shifting with thresholding and adaptive step-size control to optimize convergence speed. Further, it would be desirable to provide such a system which is relatively straightforward to implement and which can take advantage of parallel processors to further increase convergence speed.

SUMMARY OF THE INVENTION

In accordance with the present invention, an adaptive nulling antenna control system is provided which can produce a fast attack in accordance with techniques similar to a successive over relaxation algorithm. In addition, the system can provide a slow release of the null in a manner analogous to a successive under relaxation algorithm.

In particular, in accordance with one aspect of the present invention, an adaptive multibeam antenna control system for nulling a jamming signal from a communication signal is provided. The system comprises a multibeam antenna for receiving and combining a plurality of spread-spectrum signals from different directions. A switch tree coupled to these multiple antenna elements is provided for outputting the signals received by each element, one at a time. A despreader and band stop filter is coupled to the switch tree output for removing the communication signal from these signals. A scaling means is coupled to the band stop filter for controlling the bandwidth of the antenna control loop in different directions, this bandwidth being defined by the maximum rate of change of the corresponding element of a weight vector. A sequential update unit iteratively and sequentially updates the weight vector to adaptively optimize the antenna pattern despite nonstationarity of the jamming signals. An adaptive step size unit is provided for optimizing a relaxation parameter $\omega$ which defines a common step size parameter in the iterations performed by the sequential update unit. A beamformer is provided which is controlled by the sequential update unit output and which combines the multibeam antenna element signals output by means of the updated weight vector to null the jamming signal from the antenna output.

In accordance with another aspect of the present invention, a method is provided for nulling a jamming signal from a communication signal in an adaptive multibeam antenna control system. The method includes the steps of receiving a signal by a multibeam antenna signal consisting of a communication signal and an interference or jamming signal, wherein the multibeam antenna produces a plurality of signals in different directions. The next step is switching the multiple signals sequentially one at a time and then removing the communication signal from the original signal to produce an interference or jamming signal. The complex spatial correlations of the interference or jamming signal between each of the multibeam antenna elements are measured sequentially. Then, the complex correlation of interference and jamming signals is scaled to selectively control the bandwidth of the control loops corresponding to different directions, the bandwidth being defined by the maximum rate of change of the corresponding element of a weight vector. The weight vector is sequentially updated iteratively to cancel the jamming signal in the beamformer output. The step size of the iterative updating is adapted by optimizing a relaxation parameter.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS

Figure 1:
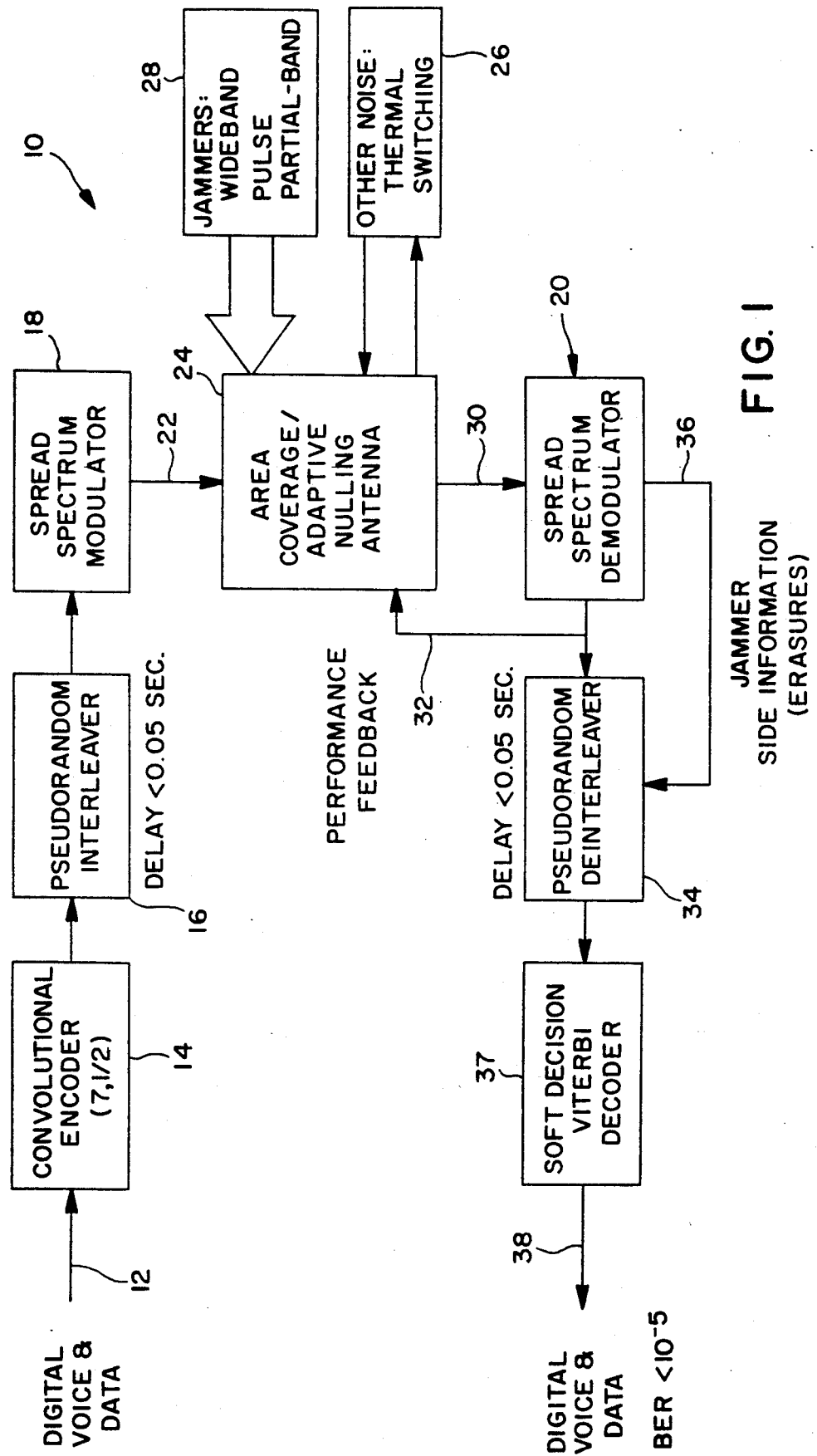
FIG. 1 is a block diagram of the overall communication link in accordance with the present invention.

Referring to FIG. there is shown a block diagram of a communication link system employing the adaptive nulling antenna system of the present invention. In the communication system 10, digital voice and data to be transmitted 12 is processed by a convolutional encoder 14. For example, digital voice and data 12 may comprise signals transmitted by a satellite in the microwave frequency range. The convolutional encoder 14 will introduce known redundancy among symbols within a few constraint lengths spacing. A pseudo random interleaver 16 then spreads related symbols much further apart. Finally, a spread spectrum modulator 18 spreads the data over a channel bandwidth many times greater than the data bandwidth. This results in a spreading of jammer power across the channel bandwidth, effectively reducing the noise density. Later, by knowing the spread spectrum code, a demodulator 20 can despread the data channel back into the data bandwidth. This modulation/demodulation operation results in a significant signal to noise ratio improvement.

After processing by the convolutional encoder 14, pseudo random interleaver 16, and spread spectrum modulator 18, the coded signal 22 is transmitted and eventually received by an area coverage adaptive nulling antenna 24. This antenna will also receive other noise such as thermal and switching noise 26 and may be subject to jamming signals 28 which may comprise wideband, pulse or partial band jamming. The task of the nulling antenna is to rapidly combine the correlated signals at the beamformer in such a way as to null the jamming signal, effectively removing it from the beamformer output 30. After processing by the spread spectrum demodulator 20, a performance feedback loop 32 is fed back to the nulling antenna 24 to allow the correlation measurements essential to the adaptive process. A pseudo random deinterleaver 34 then restores the spacing and sequence of coded symbols which were previously interleaved. However, jammer bursts are now spread pseudo randomly so that they appear as random errors within the convolutional decoder constraint length. Jammer state or side information (erasures) 36 is transmitted from the spread spectrum de-modulator 20 to the pseudo random deinterleaver 34 for the purpose of identifying those symbols which have been jammed and are not considered reliable. Finally, a soft decision Viterbi decoder 37 will use the reliability information to optimally correct errors and erasures. The resulting digital voice and data signal 38 is then available, relatively free of jamming interference, with a probability of bit error (BER) less than $10^{-5}$. This system may also be implemented without benefit of jammer state information, with minor degradations in performance. Similarly, hard decision Viterbi decoding may be substituted for soft decision decoding.

Figure 2:
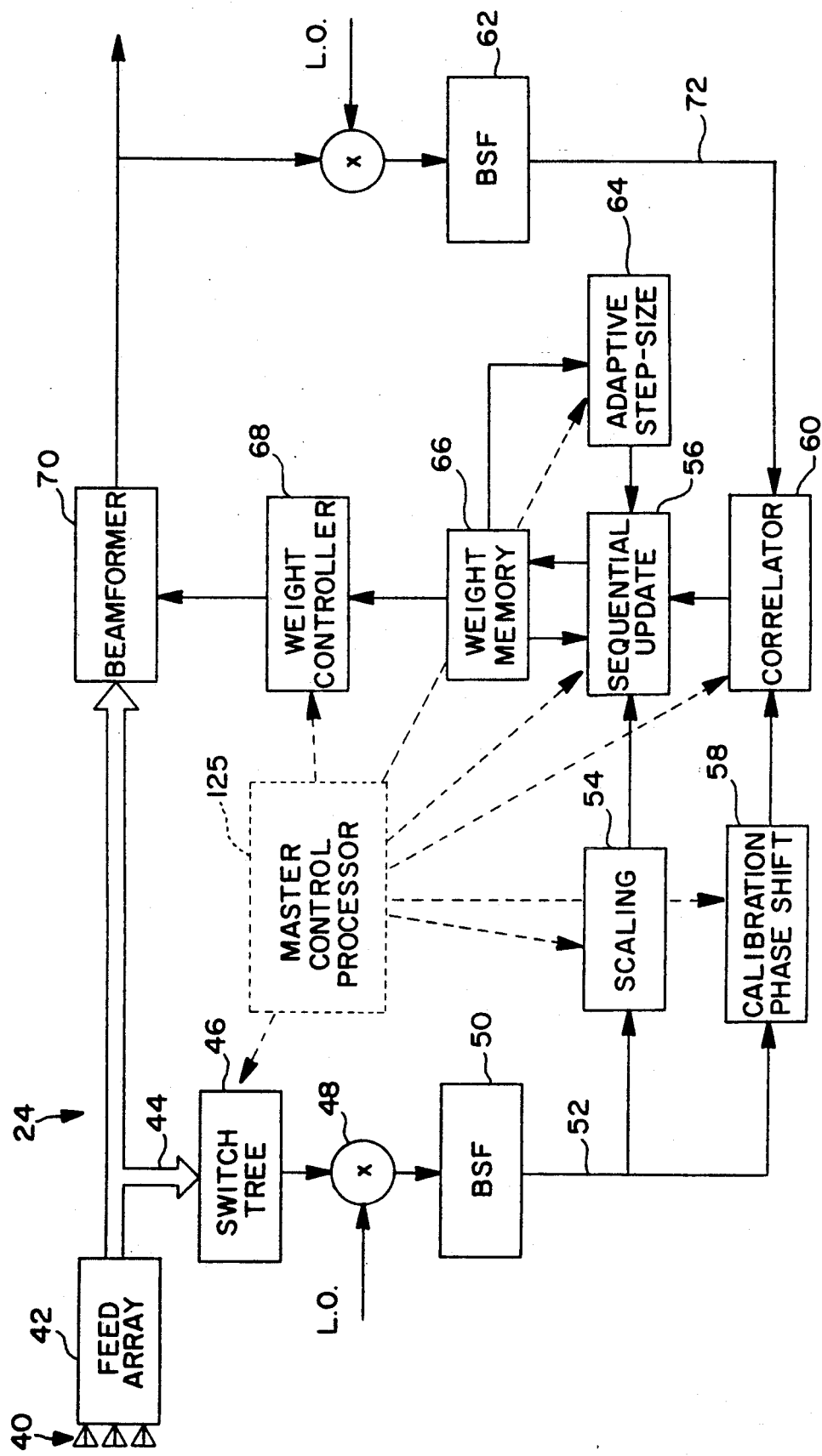
FIG. 2 is a block diagram of the adaptive antenna control system in accordance with the present invention.

Referring now to FIG. 2, the adaptive nulling antenna control system 24 is shown in more detail. The coded transmitted signal 22 is received by a multibeam antenna 40 which may comprise a conventional multibeam antenna consisting of a dish or other refractive element which forms an image of the source on an array of feedhorns laid out in a particular pattern. These feedhorns shown as feed array 42 consist of parallel paths of waveguides which are directed along path 44 by means of directional couplers to a switch tree 46. For example, there may be between 19 and 37 individual feedhorns in the feed array 42, of which three or four may capture the jammer signal. As a result, only these three or four beams will be actively involved in forming a null in subsequent processing. The other beams would not be so involved and would contribute to an area coverage pattern that would provide network service to a theater of operations.

Overall, the approach of nulling is to determine how much of a jamming signal is present in each of the individual paths of the feeder array 42 and cancelling, by appropriate gain weighting and phasing of the jamming signal. The result is that at a specific angle that the jammer happens to be at relative to the antenna, the nulling antenna produces the correct amplitude and phase of the various feed array paths with the proper weight set in a beamformer so that the jamming signal can't get through to the output at that angle.

The switch tree 46 output is fed into a local oscillator/mixer 48 which shifts frequencies and despreads the signal. For simplicity of illustration, the spread spectrum modulator 20 is not shown in FIG. 2. It should be noted that the spreading is accomplished by having the local oscillator and mixer 48 having only the same frequencies shifts that are used in the spread spectrum code but the exact manner that the synchronization occurs and how it is locked up to track it is not pertinent to the nulling processes of the present invention. Local oscillator 48 is not a constant frequency but is either a frequency hopped replica of the original frequency hopping code, or it is a pseudo-noise (PN) modulated local oscillator using the same PN code as would have been used in the direct sequence modulation for the desired signal. The result is that the desired signals compress from a very large channel bandwidth back to its essential data bandwidth that is very narrow and that is then eliminated by the band stop filter. The band stop filter lies in the original data communication band. Everything that is outside of that data communication band must have not known what the code was and therefore would not have been modulated by the code and therefore it appears as output of the band stop filter. This process is a part of the spread-spectrum demodulator process shown in FIG. 1.

Next, a band stop filter (BSF) 50 eliminates the desired signal from this correlation path so that the output along line 52 is everything that corresponds to unknown signals. That is, the output of the BSF 50 is all the signals which don't synchronize with the frequency hopping code and therefore might represent interference or undesired signals. Noise and interference gets past the BSF 50 and is not despread. The scaling unit 54, in general, consists of a power measurement. It contains decision logic on how to select the scale factor based on the power measurement that is made, this measurement being of noise and interference and undesired signals. The output of the scaling unit 54 goes to the sequential update unit 56 which controls the choice of the step size factors (or scaling factors) by dividing by a constant factor plus the power that was measured, subject to some logic steps which will be shown in more detail below.

The calibration phase shift block 58 is a signal path into a correlator 60 and basically contains a phase shifter. The purpose of the calibration phase shift 58 is to control the phase error or phase bias around the loop so that for zero phase, a zero phase measurement results. Thus, the calibration phase shift 58 is a control for a calibration procedure. Also, this device, being similar to the components used in the beamformer 70, has similar temperature drift characteristics and compensates the correlation loop against phase errors due to temperature changes.

The correlator 60 is a complex I/Q correlator which takes the input signals (one from the calibration phase shift 58 and one from a second BSF 62) and measures the complex correlation between them. It should be noted that complex implies a real and imaginary component and the output of the correlator 60 is DC. Thus, the result is an in-phase correlation and a quadrature correlation coming out of the correlator 60. This signal is fed to the sequential update 56. Where the complex number is represented by magnitude and phase and the I is the in-phase and Q is the imaginary, or quadrature, projection or component. This result has implications for the bias of the estimation process to follow.

The correlator 60 output goes to the sequential update unit 56. In essence, the sequential update unit 56 solves a difference equation (by iteration). The basic concept of the difference equation is to create a fixed point transformation so that after going through a number of iterations, the result keeps getting closer and closer to itself and eventually it converges at a fixed value. Of course, if something changes in the scene, such as the jammer location, or power level, or angle of arrival, or measurement error fluctuations, that difference equation will continually update but will always achieve the same result. At that point, a balance condition is arrived at in which the error in the update equation will have been set to zero. That is, in the update process, the residual is scaled and added to the old weight to get a new weight. But if the residual is zero, then the system continually repeats the old weight because things have not changed. This is the state of convergence and the conditions for optimizing will have been satisfied. That is, the criteria or the optimization criteria have been minimized.

Minimizing the optimization criteria is equivalent to solving a system of equations, $Ax=b$ expressed in terms of a correlation matrix A, a weight vector x, and a constraint vector b. The solution of these equations by the sequential update unit 56 in conjunction with the adaptive step size unit 64, and the weight memory storage area 66, will be discussed in more detail below. In any event, once the sequential update unit 56 reaches a solution, the weights are transmitted to the weight controller 68 which applies these weights to a beamformer 70. It will be appreciated that a beamformer is a well-known apparatus for controlling the complex gain of the individual paths by combining coherently the signals from all of the various paths. In effect, the beamformer performs an inner product between the vector of the voltages at the input to the beamformer 70 and the weight vector received by the weight controller 68. The result of correlating the multibeam antenna element signals with the beamformer output is an approximate measurement of a noise correlation matrix times the weight vector, which is a gradient of the noise power with respect to the weight space. Measuring this gradient yields important information about what direction to move in weight space to minimize the output noise power. This is accomplished by means of the feedback loop 72 to the correlator 60.

Ideally, after convergence, the beamformer 70 output would represent the communication signal with the jamming signal absent. Of course, this is never accomplished exactly due to the diffraction effects. This means that the jammer will not be arbitrarily close to the source of the communication signal, resulting in some partial cancellations. Also, there will be noise in the system and the weights in the correlation measurements will not be made exactly. Further, because of random processes, there will always be fluctuations. However, given these limitations, the system 24 will generally converge to the best solution possible.

Figure 3:
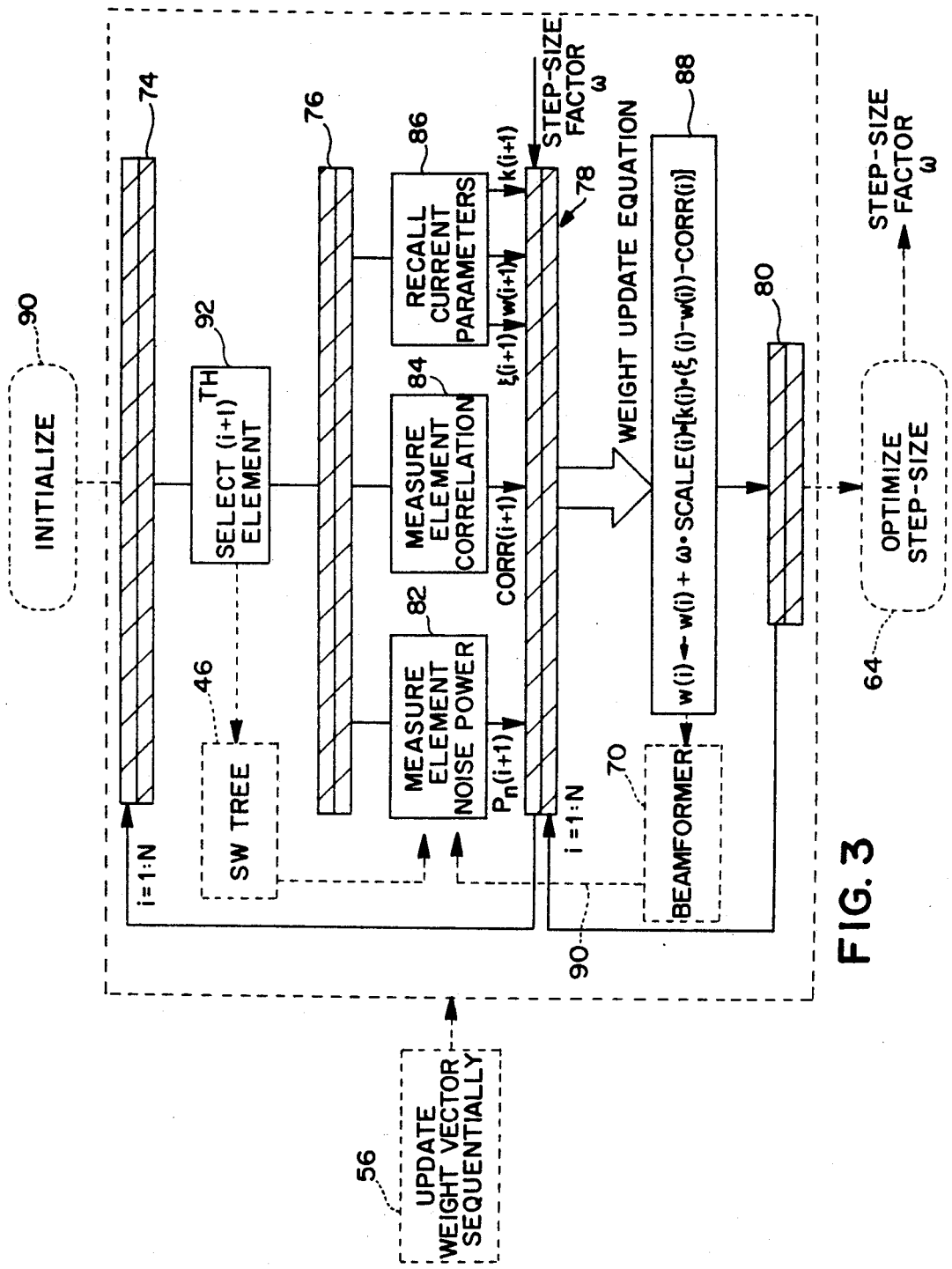
FIG. 3 is a diagram of the sequential update unit in the system shown in FIG. 2.

Referring now to FIG. 3. Further details of the sequential update 56, scaling 54 and adaptive step size 64 processes are shown. The sequential nature of the present invention is important to the convergence speed. It has been found that with regard to the total number of iterations, it is most efficient to make some progress toward the goal, rather than making all the measurements and holding back and making a block update. Thus, sequential updating makes it possible to implement the process of the present invention with a pipeline processor. That is, several steps in the iteration process in the pipeline can be performed simultaneously. In this way, the computation that must be done in the time remaining after the correlation has been measured, and before the weight are updated, is reduced. As a result, a computer using relatively modest components can be used to implement the system.

The pipeline concept is illustrated in FIG. 3 by means of the cross hatched bars 74-80 which represent the stage at which information is collected and/or must be available before proceeding to the next stage in the pipeline. For example, the steps labeled measure element noise power 82, measure element correlation 84, and recall current parameters 86 can all be done in any order or simultaneously as long as they are available at a time corresponding to the input to the cross hatched bar labeled 78. Coming out of that cross hatched bar and feeding back into the top cross hatched bar 74, is path involving the update of counter which closes a minor loop of the overall process. In other words, all of the previous steps must be completed at point 78 in each cycle of the minor loop before the information can go to the next stage, labeled weight update equation 88. Other than satisfying these completion schedule requirements, processes in different pipeline stages can be performed simultaneously and independently.

In more detail, block 90, labeled initialize, sets initial values of the beamsteering vector, weight vector, scale factors, step-size factor and initializes the counter to zero. Next, the select $(i+1)^{th}$ element block 92 will control the switch tree to connect the correlator to the $(i+1)^{th}$ element and direct addressing to recall parameters for the $(i+1)^{th}$ element. This block 92 is coupled to the switch tree 46 for the purpose of commanding a path connection from the $(i+1)^{th}$ element to the noise power and correlation measurements. Then, block 82 measures element noise power in the bandwidth outside the data bandwidth. Block 84 measures element correlation between the element noise signals and the beamformer output noise signals. Also, the recall current parameters block 86 will retrieve the $(i+1)^{th}$ element values of beamsteering vector, $\xi(i+1)$; weight vector, $w(i+1)$; and correlation scaling factor, $\xi(i+1)$.

Once blocks 82, 84 and 86 are complete, the weight update equation 88 is solved. This equation minimizes the weighted difference between the $i^{th}$ elements of the antenna pattern error and the noise correlation vector. The antenna pattern error is represented by the difference between the quiescent beam steering vector, $\xi$, and the current weight vector, $w$. The value of the weighting factor, $k(i)$, varies with jammer activity. In the absence of jamming, values of $k(i)$ much larger than the thermal noise power level constrain the algorithm to minimize the pattern error in the $i^{th}$ element beam, at the expense of a slightly larger output noise power. Jamming is detected on one of the multiple antenna beams when the noise power measurement exceeds a preset threshold. This causes the weighting factor, $k(i)$, for the corresponding beam to be reduced to a low value which relaxes the pattern error constraint in favor of reduced output noise power. The weighting factor is maintained in this low state for a preset time after jamming ceases to maintain low antenna gains in the direction of on-off jammers. This has a beneficial effect on the performance of burst error coded communication. Variations in $K(i)$ also function to shift the eigenvalues of the coefficient matrix to control convergence rates. For maximum speed and stability of convergence, it is desirable to scale the residual error by a scale factor, SCALE(i), which is the reciprocal of the sum of measured noise power on the $i^{th}$ element, $P(i)$, and a fixed weighting factor, $k_H$, i.e., $$\text{SCALE}(i) = \frac{1}{K_H + P(i)}$$

The value of $k_H$ is normally much larger than the quiescent value of $P(i)$ in the absence of jamming, but much smaller than $P(i)$ in the presence of jamming. Normally, $k(i)$ would be set equal to $k_H$ in the absence of jamming and this would result in approximate unity scaling. In the presence of strong jamming, the scale factor is dominated by the noise power measurement. Similarly, the correlation measurement, CORR(i), is dominated by increased noise power due to the sudden onset of jamming, until the adaptive antenna is able to adjust the weight vector to null the jamming signals. The scale factor, SCALE(i), ensures that sudden large increases in jammer power cannot cause the iterative difference equation to become unstable. In order to ensure as rapid convergence as possible in the presence of jamming, the weighted and scaled difference is multiplied by an optimum scalar stepsize factor, $\omega$, before being added to the current value of the $i^{th}$ weight vector. This scalar factor is optimized such that it minimizes the maximum eigenvalue of the iteration matrix, which determines the rate of decrease of error from one iteration to the next. The successive over-relaxation algorithm is stable in the range, $0 < \omega < 2$, and optimum values are usually found in the range $1 < \omega < 2$. The method of optimizing $\omega$ is described in more detail later. This updated weight vector element is transmitted to the beamformer 70 which in turn exerts an influence along line 90 back to the measure element noise power block 82 and measure element correlation block 84 for the purpose of feedback of performance for the next adjustment step.

Finally, the optimize step size block 64 (which is the same as adaptive step size 64 in FIG. 2) derives a step size factor omega which is transmitted back to parallel step 78 for the purpose of maximizing the convergence rate.

Figure 4:
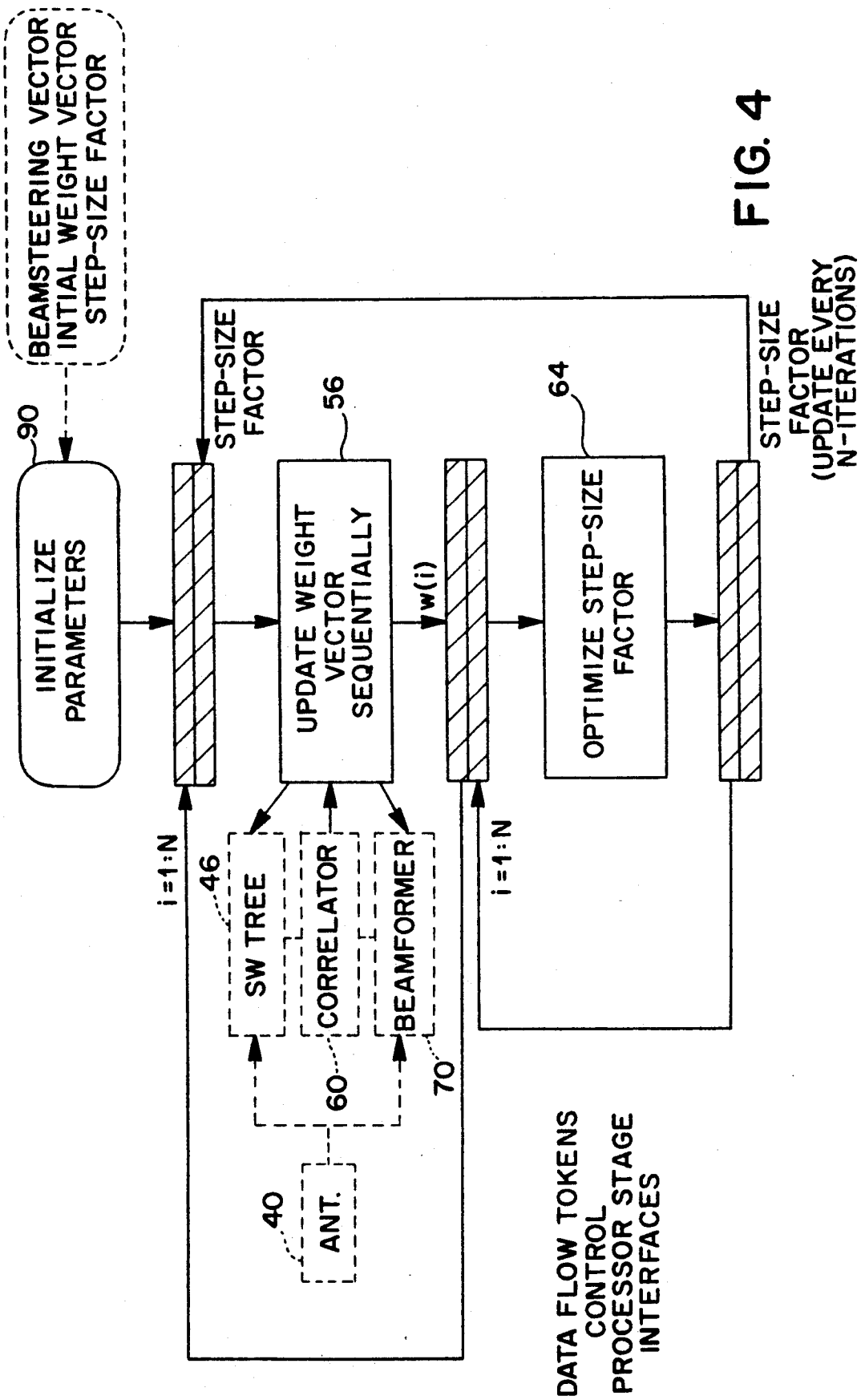
FIG. 4 is a block diagram of a portion of the system shown in FIG. 1 illustrating how the performance is optimized by optimizing the step size factor.

Referring now to FIG. 4, it is seen how the present invention optimizes its performance. Initially, the beam steering vector (which consists of weight values for the desired quiescent (area coverage) pattern), the initial weight vector (which consists of either the quiescent beamsteering vector or the current stored value of the weight vector), and the step size factor (which comes from either the current value or a preset value), is transmitted to the initialize parameter step 90 which simply sets the starting parameter values.

The weight vector is updated sequentially as in FIG. 3. Several iterations of the weight vector update are performed. The result of the update weight vector sequentially block 56 is passed on to the optimize step-size factor block 64. The purpose of this block is to examine the changes that occur in the weight vector during successive iterations and thereby to estimate the largest eigenvalue of the iteration matrix through a process described below. The step-size factor is optimized through a process which tends to minimize the maximum value of the largest eigenvalue of the iteration matrix. An updated value of the of the optimum step-size factor is fed back to the weight update loop at intervals of several iterations.

Figure 7:
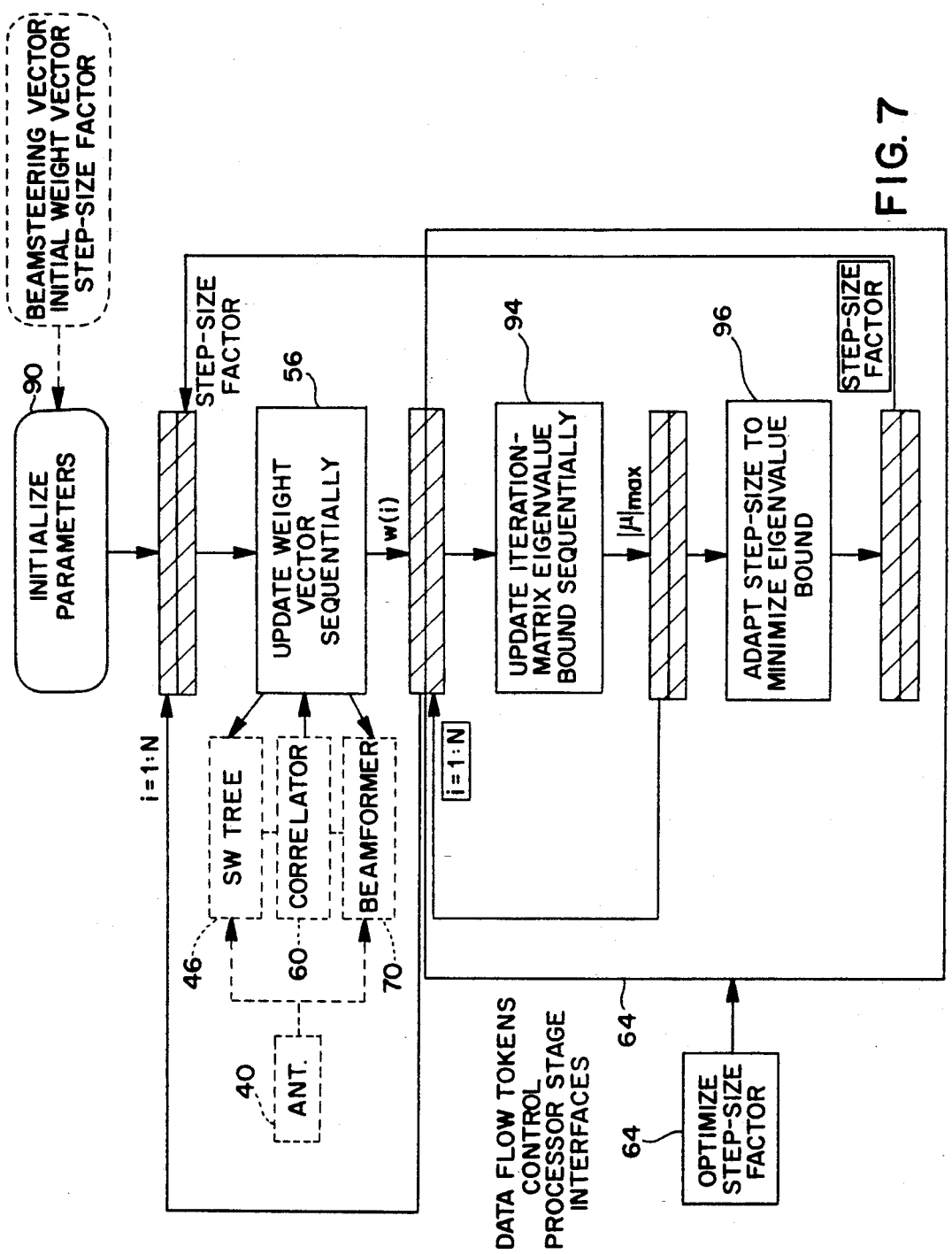
FIG. 7 is a block diagram illustrating how iteration-matrix eigenvalue bounds are sequentially updated.

Referring now to FIG. 7. Further details of the optimize step size factor step 64 is shown. In general, an update iteration-matrix eigenvalue bound sequentially step 94 estimates, $|\mu|$ max, the maximum eigenvalue of the iteration matrix. Next, the adapt step size to minimize eigenvalue bound 96 adjusts the common step-size parameter, $\omega$, to minimize the maximum eigenvalue of the iteration matrix.

Figure 8:
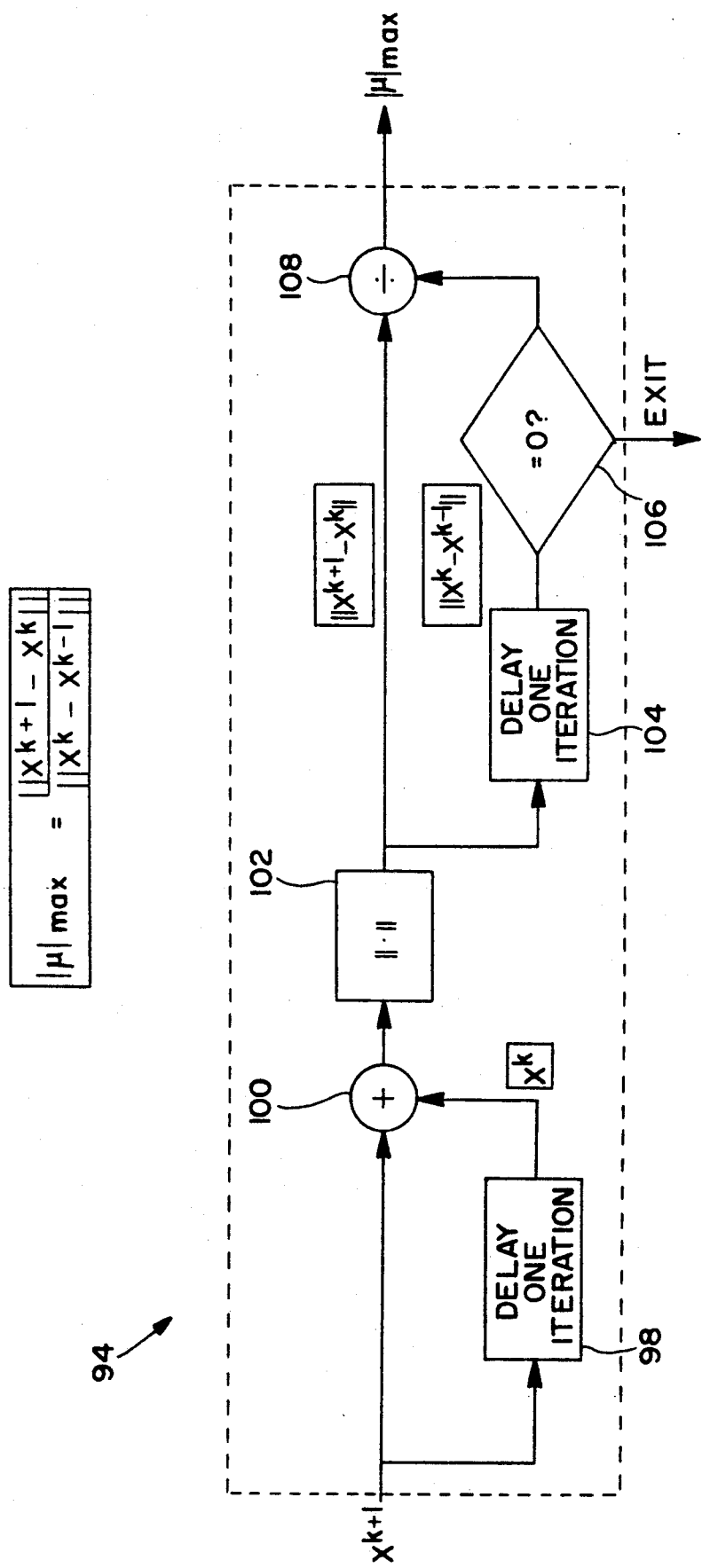
FIG. 8 is a flow-chart of the process of estimating of the iteration matrix eigenvalue.

FIG. 8 shows the update iteration matrix eigenvalue bound sequentially step 94 in more detail. An estimate of the largest eigenvalue of the iteration matrix is obtained by observing the changes that occur in the weight vector over a period of three iterations. In FIG. 8, the difference of the weight vectors at the $(k+1)^{th}$ iteration and $k^{th}$ iterations are continuously differenced by means of a one iteration delay function (98) and a differencing operation (100). The norm operation (102) computes the square root of the accumulated sum of squares of differences in the weight vector, each time after all the elements of the weight vector have been updated. The successive values of the norms of differences are ratioed by means of a one iteration delay function (104) and a divide function (108). Division by zero, which is not defined, is censored by means of a test (106) for a zero norm in the denominator.

Figure 6:
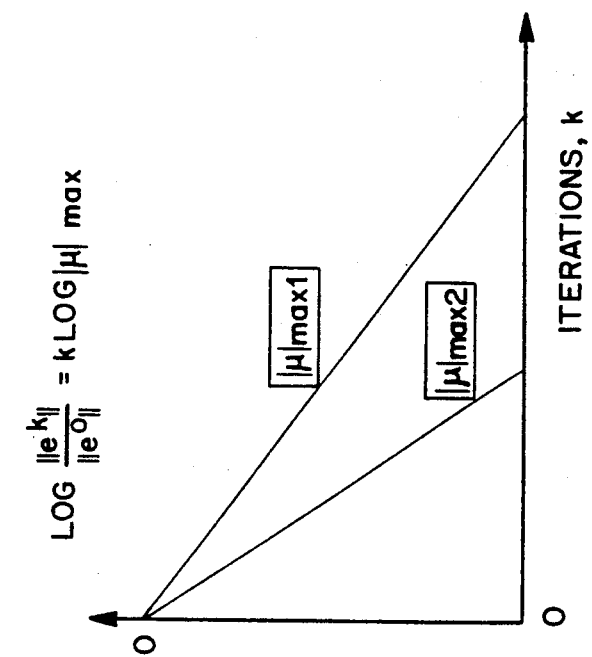
FIG. 6 is a graph of the log error ratio versus number of iterations.
Figure 5:
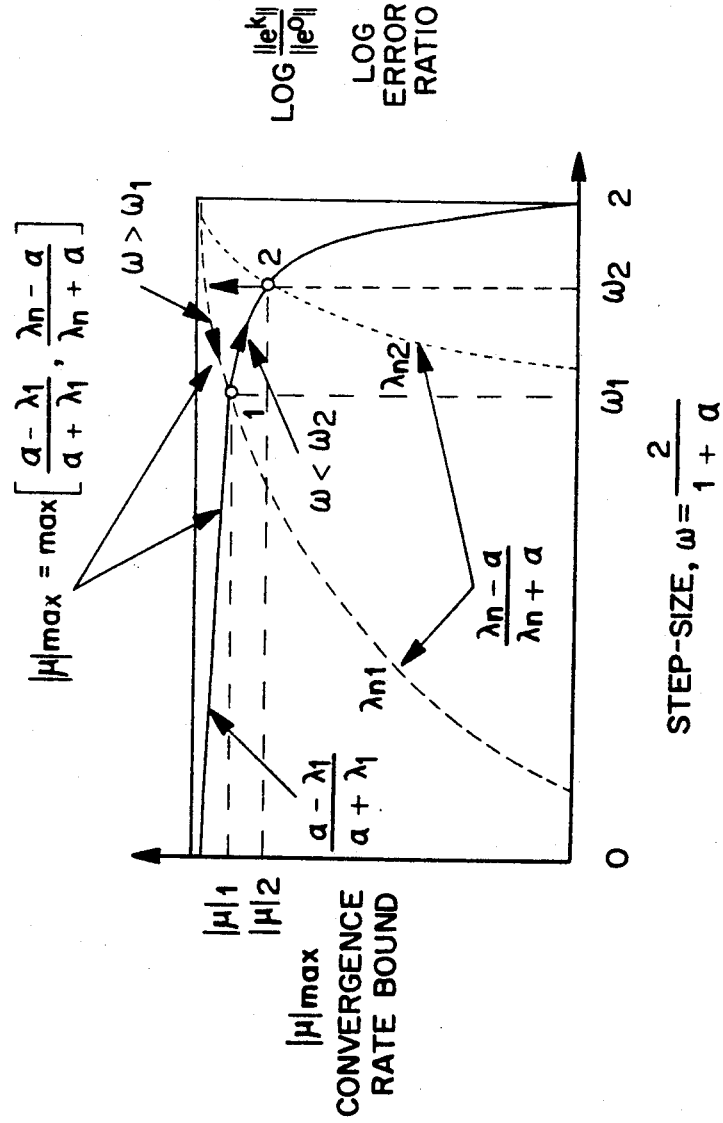
FIG. 5 is a graph of the convergence rate bound versus step size.

The adapt step size to minimize eigenvalue bound step 96 may be understood first by reference to FIGS. 5 and 6. The curves in FIG. 5 show the relationship between the min-max bounds on the eigenvalues of the iteration matrix and the eigenvalues of the row-scaled coefficient matrix, A, in the system of equation, $Ax = b$, which is to be solved by iteration. In the successive over-relaxation method, it can be shown that the largest eigenvalue of the iteration matrix, $|\mu|$ max, is bounded by the largest of two bilinear functions of a parameter, $\omega$. In order to simplify the notation, $\omega$, is expressed as a bilinear function of another parameter, $\alpha$.

The bounding curves are altered by changes in the noise environment, which is reflected in changes of the largest and smallest eigenvalues, $\lambda_n$ and $\lambda_1$, respectively, of the scaled coefficient matrix, A. This gives rise to variation in the shape of the bounding curves, hence their cross-over point, which is an estimate of the optimum step-size factor which minimizes the maximum eigenvalue of the iteration matrix. In the example illustrated by FIG. 5, the smallest eigenvalue, $\lambda_1$ is assumed to be fixed. the largest eigenvalue changes the shape of one of the curves, hence the cross-over point which defines the step-size factor that minimizes the maximum eigenvalue of the iteration matrix. FIG. 6 illustrates how the rate of convergence of the error is affected by changes in this bound. The smaller the bound, the steeper the log error ratio becomes. Hence the smaller the number of iterations required to achieve a given degree of convergence.

To avoid a long search procedure in adjusting the step-size, it is sufficient to estimate the largest eigenvalue of the iteration matrix and, knowing the present value of the step-size parameter, deduce the largest eigenvalue of the coefficient matrix, $\lambda_n$. This gives enough information to determine the shape of one of the bounding curves and the current location on that curve. With the bounding curves thus determined, the optimum step-size factor which minimizes the maximum eigenvalue can be determined in one step.

Figure 9:
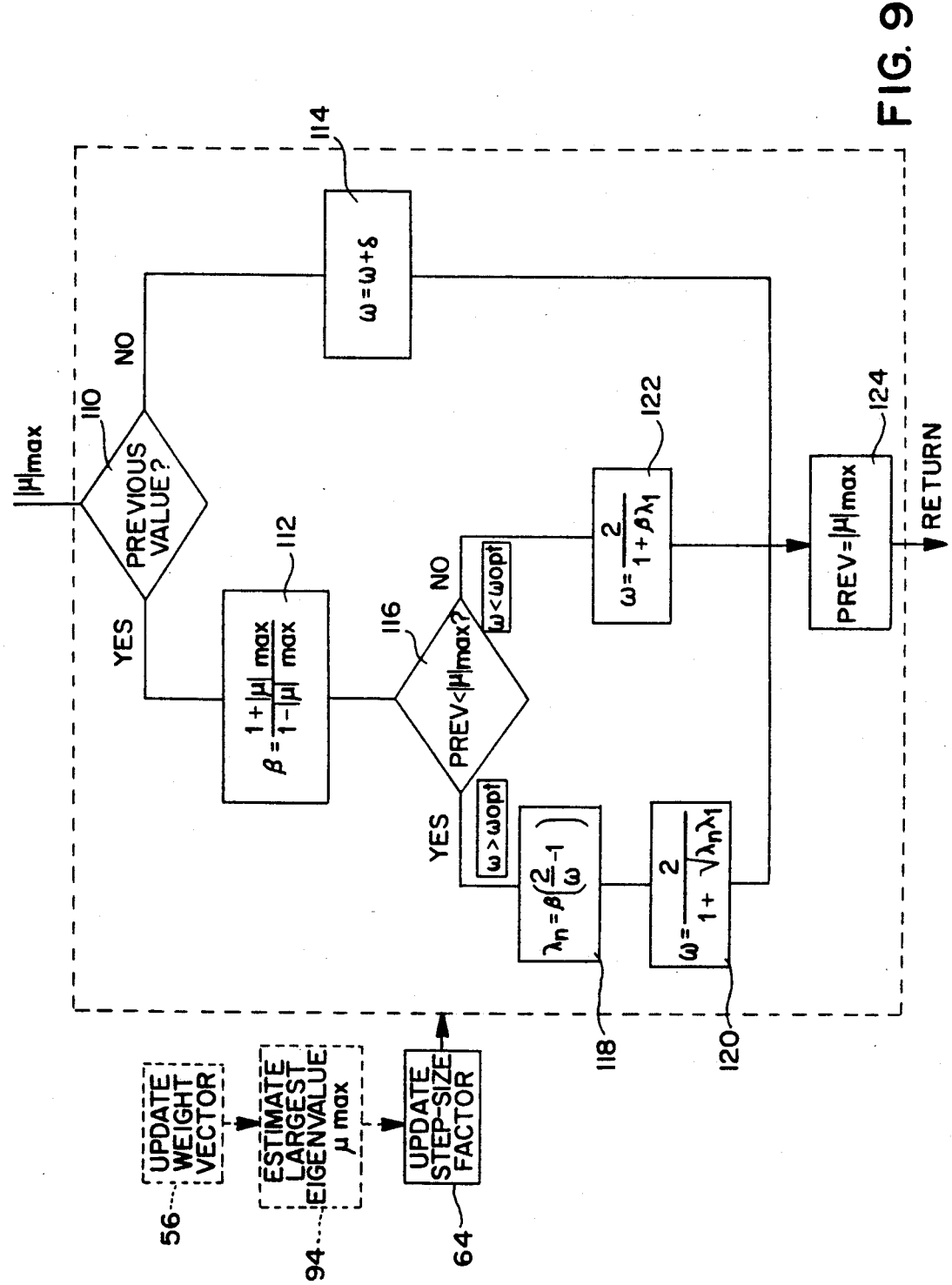
FIG. 9 is a flow chart of the decisions and steps employed to update the step size factor.

More details of the logic involved in this stepsize iteration are shown by the logic diagram of FIG. 9. The calculation begins with the estimated current value of $|\mu|_{max}$ which is to be compared with the previous estimates. Obviously, there must be a previous estimate for such a comparison to succeed. This is tested in the "PREVIOUS VALUE?" block 110 If the test is negative, the default step is to iterate the step-size factor by a fixed amount, store the current estimate in PREV, and obtain another estimate of the largest eigenvalue with the new step-size factor.

If the test is positive, as it always will be after the initial attempt, a parameter, $\beta$, is calculated 112 using the current estimate of $|\mu|_{max}$. The current estimate of $|\mu|_{max}$ is tested 116 against PREV to determine the location on the bounding curve, relative to the optimum. If the test is positive (YES), then the current value of the step-size factor is larger than the optimum and the current bound on the eigenvalue lies above the optimum on a curve whose shape is bilinear function of the largest eigenvalue, $\lambda_n$. This eigenvalue can be estimated from the current step size, $\omega$, and the value of $\beta$, which is the bilinear function of $|\mu|_{max}$ just computed in block 112. This estimate of $\lambda_n$ is computed in block 118. The optimum step-size factor, which is function of $\lambda_n$ and the (fixed) value of $\lambda_1$ is computed in block 112. The current estimate of $|\mu|_{max}$ is stored in PREV by block 124. Then the updated estimate of the step-size factor, $\omega$, is returned for further iterations of the main loop of the weight update algorithm.

If the test in block 116 is negative, then the step-size factor is less than the optimum value, so the current value of $|\mu|_{max}$ lies on the other bounding curve in FIG. 5. The optimum step-size factor is computed directly from the value of $\beta$ found in block 112 and a fixed value of $\lambda_1$. The fixed value of $\lambda_1$ has been found to be noncritical in computer simulations of this process and is set to a threshold value which is experimentally determined. Again, the result of this branch is an estimate of the optimum step-size factor, $\omega$, which is returned after storing the current value of $|\mu|_{max}$ in PREV.

A master control processor 125 shown in FIG. 2 is connected to all of the main components described above. Depending on the type of hardware implementation, it may perform some or all of the functions of these components. In a preferred embodiment, the master control processor 125 may comprise a pipeline processor consisting of multiple-instruction, multiple data (MIMD) architecture, using multiply-and-add stages, with CORDIC algorithms to perform special functions.

Figure 10:
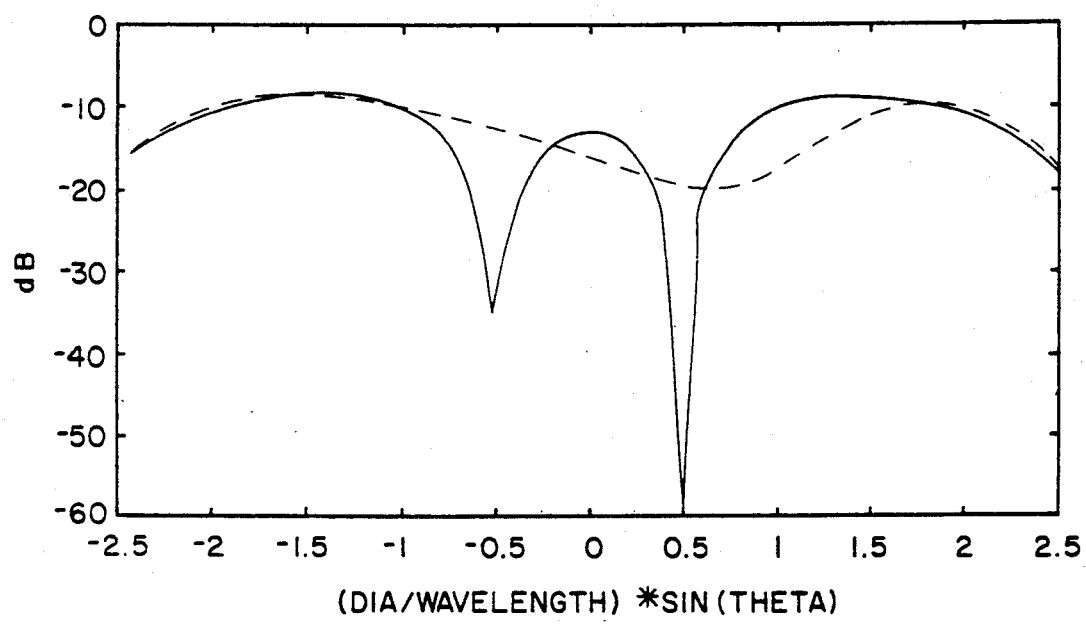
FIG. 10 is a graph showing how nulling is affected by the size of the weight factor k.

Referring now to FIG. 10. There is shown a plot of a plane cut through the area coverage of the nulling antenna system 24 for both a large weight factor, k (shown as the dashed curve) and for a small weight factor k (shown as the solid curve.) The nulling antenna system 24 has produced nulls at approximately $-0.5+0.5$ (dia/wavelength)*(sin) (theta). This offers the jammer a very low gain (at the location of the jammer signal) relative to the other communication systems in the overall pattern. It should be noted that if the attitude of the antenna wanders, or if the platform on which the antenna is mounted is unstable, then the relative angle with respect to the jammer source changes and the jammer signal may get through unless the system adapts. Similarly, component drift, or a jammer shutting down and moving to another location, or the presence of a second jammer may necessitate adaptation by the system. For this reason, the nulling antenna system 24 remains in a continual state of adaptation to account for the dynamics of the jamming environment.

Referring again to FIG. 10, it should be noted that while a large weight factor k produces shallower nulls, it yields better area coverage near the jammer. On the other hand, a small weight factor k relaxes the pattern error constraint but allows deeper nulls. Practical applications generally require a tradeoff of these conflicting goals to set the fixed weighting factor k. The present invention uses a threshold comparison of jammer power in each beam of a multibeam antenna to determine the appropriate setting of k for that beam. Thus, in accordance with the present invention, a jammer adaptive weighting factor will tend to satisfy both goals to a higher degree.

It will be appreciated that the adaptive nulling antenna system 24 effectively nulls jammed beams quickly and holds the null on pulse jammers with a slow relaxation. Sequential updating produces simpler weight control and fast convergence while permitting the use of a pipeline processor. Scaling and adaptive memory constrains the pulse interference duty factor by nulling jammed beams quickly and holding the null on the pulse jammer. The adaptive step size factor optimizes the speed of convergence. The switching self interference duty factor may be kept very low such as less than 0.0075. Those skilled in the art can appreciate that other advantages can be obtained from the use of this invention and that modification can be made without departing from the true spirit of the invention after studying the specification, drawings and following claims.

What is claimed is:

1. An adaptive multibeam antenna control system for nulling a jamming signal from a communication signal, said system comprising:
   multibeam antenna for receiving a plurality of signals from different directions;
   switch tree coupled to said signals for outputting said signals one at a time;
   band stop filter coupled to said switch tree output for removing said communication signal from said signals;
   scaling means coupled to said band stop filter for controlling the loop bandwidth of said antenna in different directions, the gain in those directions being defined by a weight vector;
   sequential update means for iteratively and sequentially updating said weight vector to match the power of said jamming signal;
   adaptive step size means for optimizing a relaxation parameter which defines step sizes in the iteration performed by said sequential update means; and
   beamformer coupled to said sequential update means output and also to said multibeam antenna for combining said updated weight vector signal with said antenna signal to null said jamming signal from said antenna output.

2. The system of claim 1 wherein said jamming signal is a pulsed signal.

3. The system of claim wherein said sequential update means further comprises:
   means for selecting the $(i+1)^{th}$ element;
   means for measuring the element noise power;
   means for measuring the element correlation;
   means for recalling current parameters; and
   means for calculating a weight update equation.

4. The system of claim 3 wherein said adaptive step size means further comprises:
   means for updating the iteration matrix eigenvalue bound sequentially; and
   means for adapting the step size to minimize the eigenvalue bound.

5. The system of claim 4 wherein said scaling means further comprises:
   means for determining if there was a previous jammer signal; and
   means for determining what the previous scale factor was.

6. The system of claim 1 wherein said communication signal is a coded signal and wherein said band stop filter removes signals containing said coding.

7. The system of claim 6 wherein said coding includes spread spectrum coding.

8. The system of claim 1 further comprising:
   a correlator means for measuring the complex correlation between the beamformer output and the band stop filter output; and
   feedback loop coupling said beamformer output to said correlator.

9. A method for nulling a jamming signal in an adaptive multibeam antenna control system, said method comprising the steps of:
   receiving a signal in a multibeam antenna, the signal comprised of a communication signal and a jamming signal,
   said multibeam antenna receiving a plurality of signals from different direction;
   switching said multiple signals sequentially one at a time;
   removing said communication signal from said signal to produce a jamming signal;
   scaling said jamming signal to selectively control the loop bandwidth of said antenna in different directions, the gain in those directions being defined by a weight vector;
   sequentially updating said weight vector iteratively to adapt to said jamming signal;
   adapting the step size of said iterative updating by optimizing a relaxation parameter; and
   coupling said scaled signal with said antenna output so as to null said jamming signal from said antenna output.

10. The system of claim 9 wherein said step of sequentially updating means further comprises the steps of:
    selecting the $(i+1)^{th}$ element;
    measuring the element noise power;
    measuring the element correlation;
    recalling current parameters; and
    calculating a weight update equation.

11. The system of claim 10 wherein said step of adapting the step size further comprises the steps of:

updating the iteration matrix eigenvalue bound sequentially; and adapting the step size to minimize the eigenvalue bound.

12. The system of claim 11 wherein said step of scaling further comprises the steps of:

determining if there was a previous jammer signal; and determining what the previous scale factor was.

13. An adaptive multi-beam antenna control system for nulling a pulsed jamming signal from a coded communication signal, said system comprising:

multi-beam antenna for receiving a plurality of signals from different directions;

switch tree coupled to said signals for outputting said signals one at a time;

band stop filter coupled to said switch tree output for removing said coded communication signal from said signals;

scaling means coupled to said band stop filter for controlling the loop bandwidth of said antenna control loop in different directions, the gain in those directions being defined by a weight vector, said scaling means further including means for determining if there was a previous jammer signal;

means for determining what the previous scale factor was;

sequential update means for iteratively and sequentially updating said weight vector to match the power of said jamming signal;

adaptive step-size means for optimizing a relaxation parameter which defines step-sizes in the iteration performed by said sequential update means; and beamformer means coupled to said sequential update means output and also to said multi-beam antenna for combining said updated weight vector signal with said antenna signal to null said jamming signal from said antenna output.

14. The system of claim 13 wherein said sequential update means further comprises:

means for selecting the $(i+1)^{th}$ element;

means for measuring the element noise power;

means for measuring the element correlation;

means for recalling current parameters; and means for calculating a weight update equation.

15. The system of claim 13 wherein said adaptive step size means further comprises:

means for updating the iteration matrix eigenvalue bound sequentially; and means for adapting the step size to minimize the eigenvalue bound.

* * * * *